United States Patent
Fukaya et al.

(10) Patent No.: US 6,847,902 B2
(45) Date of Patent: Jan. 25, 2005

(54) ADJUSTMENT-CIRCUIT EMBEDDED SEMICONDUCTOR SENSOR AND TORSION BAR TYPE TORQUE SENSOR SYSTEM

(75) Inventors: Shigetoshi Fukaya, Toyota (JP); Kenji Takeda, Okazaki (JP); Naoki Nakane, Toyota (JP); Kiyoshi Sugimura, Toyoake (JP)

(73) Assignees: Nippon Soken, Inc., Aichi-ken (JP); DENSO Corporation, Kariya (JP)

( * ) Notice: Subject to any disclaimer, the term of this patent is extended or adjusted under 35 U.S.C. 154(b) by 0 days.

(21) Appl. No.: 10/355,019

(22) Filed: Jan. 31, 2003

(65) Prior Publication Data

US 2003/0155627 A1 Aug. 21, 2003

(30) Foreign Application Priority Data

Feb. 15, 2002 (JP) ........................................ 2002-038879

(51) Int. Cl.[7] .................................................. G01L 1/00
(52) U.S. Cl. .............................. 702/43; 73/862.33; 73/5
(58) Field of Search .................................. 374/1; 324/105; 365/195; 702/43, 41, 156; 73/862.335

(56) References Cited

U.S. PATENT DOCUMENTS

| 4,784,002 | A | | 11/1988 | Io et al. |
|---|---|---|---|---|
| 4,984,474 | A | | 1/1991 | Matsushima et al. |
| 5,062,062 | A | * | 10/1991 | Nishibe et al. ................ 702/41 |
| 5,412,998 | A | * | 5/1995 | Nakamoto et al. ...... 73/862.335 |
| 5,640,085 | A | * | 6/1997 | Petr et al. .................... 324/105 |
| 5,912,849 | A | * | 6/1999 | Yasu et al. ................... 365/195 |
| 6,283,628 | B1 | * | 9/2001 | Goodwin ........................ 374/1 |
| 6,542,848 | B1 | * | 4/2003 | Neeser et al. ................ 702/156 |

FOREIGN PATENT DOCUMENTS

| JP | A-H6-281513 | 10/1994 |
|---|---|---|
| WO | WO 02/071019 A1 | 9/2002 |

* cited by examiner

Primary Examiner—John Barlow
Assistant Examiner—Xiuqin Sun
(74) Attorney, Agent, or Firm—Posz & Bethards, PLC (57) ABSTRACT

A torsion bar type torque sensor system is provided with the following: an elastic member that receives a torque and converts the torque to a torsion displacement; a multipolar ring magnet in which N poles and S poles are circumferentially and alternately magnetized; a pair of magnetic yoke halves disposed coaxially with the ring magnet; and a magnetometric sensor that detects magnetic flux generated between the pair of the magnetic yoke halves. The magnetometric sensor is made of a semiconductor that integrates a semiconductor magnetometric sensor, a non-volatile memory, a computation circuit, and an output circuit. This structure provides a torque sensor system that has an excellent maintainability.

13 Claims, 5 Drawing Sheets

ADJUSTMENT-CIRCUIT EMBEDDED SEMICONDUCTOR SENSOR AND TORSION BAR TYPE TORQUE SENSOR SYSTEM

CROSS REFERENCE TO RELATED APPLICATIONS

This application is based on and incorporates herein by reference Japanese Patent Application No. 2002-38879 filed on Feb. 15, 2002.

FIELD OF THE INVENTION

The present invention relates to an adjustment-circuit embedded semiconductor sensor and a torsion bar type torque sensor system that uses the adjustment-circuit embedded semiconductor sensor.

BACKGROUND OF THE INVENTION

A conventional torsion bar type torque sensor system uses a permanent magnet as a magnetic flux generator, so that residual magnetic flux density variation due to temperature variation adversely affects on sensitivity of a torque sensor. Deviation in a size, kind, and material characteristic of the permanent magnet results in fluctuation of the sensitivity and an offset value (zero point output) of the torque sensor.

The conventional torsion bar type torque sensor system is therefore equipped with a temperature sensor such as a thermistor around the permanent magnet. According to temperature detected by the temperature sensor, adjustment for the fluctuation is executed in a circuit outside the sensor.

However, the above method, so-called an external adjustment method, involves additional installment of a separated external adjustment circuit for the adjustment or enlargement of a control section of the torque sensor system when the adjustment circuit is added to the control section of the torque sensor system. This results in increasing a size and cost of the torque sensor system. Furthermore, replacement of the sensor part itself due to its breakdown invalidates previous adjustment data in the above adjustment circuit. This therefore poses replacement of the entire torque sensor system including the external adjustment circuit, which eventually increases cost in maintenance. The above problem occurs not only in the torsion bar type torque sensor system but also in a usual sensor system.

SUMMARY OF THE INVENTION

It is an object of the present invention to provide an adjustment-circuit embedded semiconductor sensor and a torsion bar type torque sensor system that adopt the adjustment-circuit embedded semiconductor sensor.

To achieve the above and other objects, an output-adjustment embedded semiconductor sensor is provided with a plurality of sections, which are integrated in the sensor. Here, a detecting section detects at least either of a physical amount and a chemical amount as an electric amount. A thermal detecting section detects a temperature. A non-volatile rewritable memory section rewritably stores adjustment data to adjust an error of the detected electric amount. An adjustment computation section for outputting an adjusted signal after offset adjustment of the detected electric amount, sensitivity adjustment and temperature adjustment, based on the detected temperature and stored adjustment data.

Namely, the semiconductor sensor is formed of a monolithic one-chip IC including the above sections, so that it internally executes the offset adjustment, sensitivity adjustment and temperature adjustment. Breakdown of the sensor therefore involves only replacement of the sensor itself without any replacement nor additional adjustment of the external circuit, which results in simplifying maintenance of the sensor system.

It is preferable that the semiconductor sensor is further provided with an operation control section for externally receiving an operation command and subsequent adjustment data. Here, the operation control section writes the subsequent adjustment data in the non-volatile rewritable memory when the operation command is a writing command. This enables writing of the adjustment data to the non-volatile rewritable memory to be easy.

It is furthermore preferable that when the operation command is a writing-prohibiting command, the operation control section prohibits the writing of the subsequent adjustment data in the non-volatile rewritable memory. This prevents noise or other abnormal events from rewriting false adjustment data to the non-volatile rewritable memory.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)
(Structure)

Figure 1:
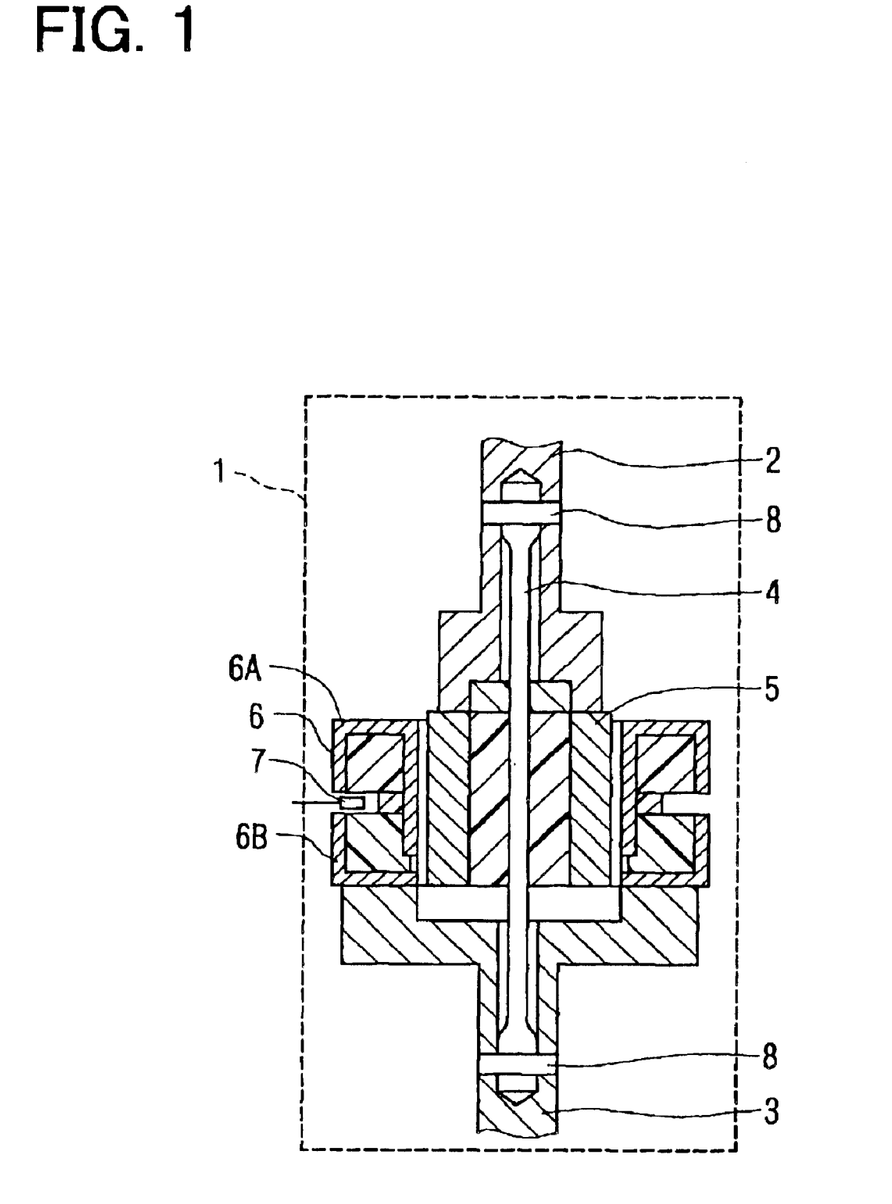
FIG. 1 is an axial section view of a torque sensor system according to a first embodiment of the present invention.

A torque sensor system as a first embodiment of the present invention is used for, e.g., electric power steering equipment. Referring to FIG. 1, the torque sensor system is disposed between an input shaft 2 and an output shaft 3, both of which compose a steering shaft, detects steering torque applied to the steering shaft.

The input and output shafts 2, 3 are, relatively rotationally and torque-transmittably, combined by a torsion bar 4. A ring magnet 5 is fixed by fitting it together with the edge of the input shaft 2, while a magnetic yoke 6 is fixed to the edge of the output shaft 3.

The circumferential area of the ring magnet 5 is magnetized in alternate poles at a predetermined circumferential pitch. The magnetic yoke 6 has two magnetic yoke halves 6A, 6B that are fixed coaxially with the output shaft 3 at a predetermined spacing. The magnetic yoke halves 6A, 6B, made of a soft magnetic member, are roughly L-shaped and roughly U-shaped, respectively, in an axial section as shown in FIG. 1. They have teeth that surround the ring magnet 5, at a predetermined gap relative to the circumference of the ring magnet 5, and axially extend at a predetermined circumferential pitch. They also have circular ring plates that radially-outwardly extend from the bottom edges of the teeth, and cylinder hollows that axially extend from the circumferential edges of the circular ring plates. The teeth of the magnet yoke halves 6A, 6B are circumferentially and alternately disposed. Magnetic flux from N pole of the ring magnet 5 reaches S pole of the ring magnet 5 via a circuit. This circuit travels through teeth of one of the yoke halves 6A, 6B that radially-outwardly adjoins the N pole, the cylinder hollow of the one of the yoke halves 6A, 6B, the cylinder hollow of the other of the yoke halves 6A, 6B, and the teeth of the other of the yoke halves 6A, 6B.

A magnetometric sensor IC 7 is fixed in a stationary state within the axial spacing between the magnetic yoke halves 6A, 6B, for detecting the magnetic field variation in the spacing. Pins 8 are for fixing the torsion bar 4.

In the above structure, application of torque to the input shaft 2 leads to torsion in the torsion bar 4, so that the torque is transmitted to the output shaft 3. Occurrence of relative rotational position difference (i.e., relatively rotated angle) between the ring magnet 5 and the magnetic yoke 6 causes variation in the magnetic flux density between the cylinder hollows of the magnetic yoke 6. This variation of the magnetic flux density is externally outputted.

The magnetometric sensor (M sensor) IC 7 will be explained below, referring to FIG. 3. The magnetometric sensor IC 7 that is integrated to one chip includes the following: three terminals of a voltage source terminal 7A, a ground (GND) terminal 7B, and an output terminal 7C; a thermal detector 7E for detecting temperature in a vicinity of the magnetometric sensor IC 7; an oscillator 7F for providing reference clock to each section of the IC; a magnetometric sensor 7G such as a hall element for detecting magnetic flux density; an analog/digital (A/D) converter section 7H for converting output analog voltage of the magnetometric sensor 7G to a digital value; a non-volatile memory 7N for storing adjustment data, a computation section 7I for computing adjustment of digital signals outputted from the A/D converter section 7H based on data stored in the non-volatile memory 7N; a digital/analog (D/A) converter section 7J for reconvert, to analog voltage, the digital values of the computed result in the computation section 7I; a buffer 7K for externally outputting the reconverted analog voltage; a logic section 7L for determining computing operation of the computation section 7I based on power voltage applied to the voltage source terminal 7A; and a lock section 7M for disabling rewriting to the non-volatile memory 7N based on the determination of the logic section 7L.

The logic section 7L detects voltage level applied to the voltage source terminal 7A to determine whether the voltage level corresponds to usual measurement operation or writing operation in the non-volatile memory 7N. When the writing operation is determined, the logic section 7L digitalizes voltage variation of the voltage source terminal 7A to obtain digital signals. The digital signals are written in the non-volatile memory 7N through the lock section 7M. The logic section 7L has a comparator for determining the power voltage level. When the usual measurement operation is determined, the lock section 7M commands prohibition of the writing in the non-volatile memory 7N, based on a command from the logic section 7M.

The computation section 7I, the logic section 7L, and the lock section 7M are formed from well-known generalized circuitry. They are also obviously realized from usual hardware logic circuitry or microcomputer software, so that detail explanation about the circuitry is not described hereunder.

(Usual Detecting Operation)

A usual operation voltage (e.g., 5V) is applied to the voltage source terminal 7A, so that each circuit of the magnetometric sensor IC 7 is supplied with necessary power (electric voltage, electric current).

The oscillator 7F provides each circuit with pulse signals of a constant cycle as the reference clock. An analog voltage value of the magnetic flux density information outputted from the magnetometric sensor 7G is converted by the A/D converter section 7H to digital values to be transmitted to the computation section 7I. A voltage value of temperature information outputted from the thermal detector 7E is transmitted to the magnetometric sensor 7G and the computation section 7I. A measurement signal, indicating that a usual measurement should be executed at present, outputted from the logic section 7L is transmitted to the computation section 7I. The computation section 7I, based on the above information and parameters stored in the non-volatile memory 7N, adjusts the magnetic flux density information detected by the magnetometric sensor 7G to digital information to transmit to the D/A converter section 7J. The digital information is converted by the D/A converter section 7J to analog voltage to externally transmit via the buffer 7K.

(Non-Detecting Operation)

An unusual voltage (e.g., 6V and more) other than the usual operation voltage is applied to the voltage source terminal 7A longer than a predetermined period, so that the logic section 7L detects the unusual voltage to determine that a program mode is commanded. The logic section 7L then reads out binarized voltage variation patterns (e.g., high-8V, low-6V) to determine an external command. The external command includes a rewriting command for rewriting the data stored in the non-volatile memory 7N, a data-reading command for commanding the computation section 7I to externally output the data stored in the non-volatile memory 7N via the buffer 7K, and a lock command for retaining the data stored in the non-volatile memory 7N. When the logic section 7L determines the lock command, it commands the lock section 7M to prohibit rewriting of the non-volatile memory 7N. The installment of the lock section 7M prevents wrong rewriting in the non-volatile memory 7N even when voltage variation due to an external disturbance is wrongly determined to be the rewriting command.

Figure 4:
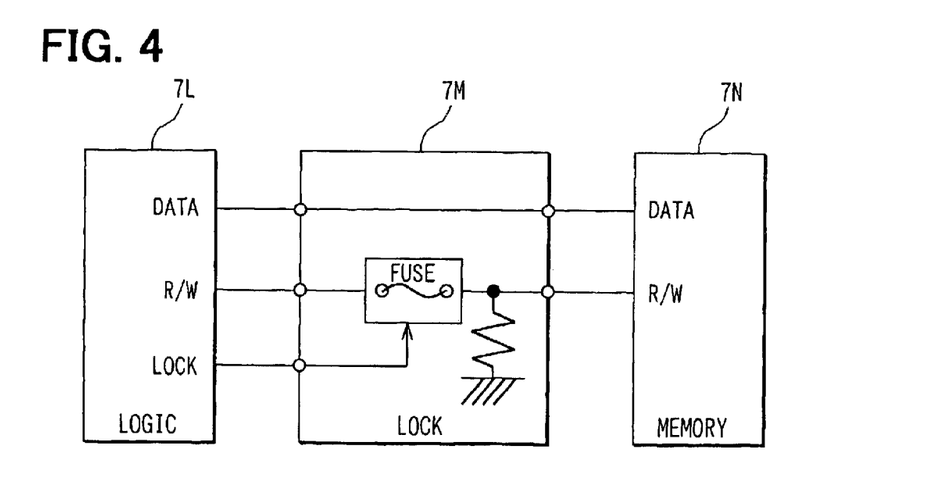
FIG. 4 is a schematic block diagram of a lock section of the magnetometric sensor IC.

Referring to FIG. 4, the lock section 7M is typically formed between an R/W terminal of the logic section 7L and an R/W terminal of the non-volatile memory 7N. The lock section 7M includes a transfer gate or a MOS transistor 71 forming an inverter circuit, and a circuit for intermittently controlling the MOS transistor 71 based on a potential state inputted through a one-time writable non-volatile memory (PROM) such as a fuse ROM. When the logic section 7L blows out the PROM to irreversibly turn off, the transfer gate is set to off to prohibit the logic section 7L from writing in the non-volatile memory 7N. By contrast, writing capability can be once again possible by other methods such as ultra-violet erasure other than the voltage signal method.

(Effect)

A conventional torque sensor system is controlled with a detecting signal of a torque sensor. The conventional torque sensor system is composed of the torque sensor, a torque sensor unit as a mechanical part, and an electronic control unit (ECU) that computes, with the output signal from the torque sensor unit, a control signal to output. Adjustment of a torque sensor characteristic is executed in the ECU by adjusting, before shipment of the system, an adjustment circuit attached to the ECU or by storing adjustment information in a non-volatile memory of the ECU. Breakdown of the above torque sensor unit involves entire replacement of the torque sensor system on site or additional adjustment in the ECU after the partial replacement. Breakdown of the ECU also involves the same procedures similar to that in the breakdown of the torque sensor unit. A lot of recovery work is therefore imposed to the above breakdown.

In the embodiment, the magnetometric sensor, constituting the torque sensor, has the integrated non-volatile memory and various processing circuits, so that offset adjustment, sensitivity adjustment, and temperature characteristic adjustment are executed within the torque sensor. When the torque sensor is broken, the recovery work involves only replacement of the broken torque sensor without adjustment in the ECU. This results in credibly decreasing time and cost of the recovery work. When the ECU is broken, only replacement of the ECU is involved without any additional adjustment in the replaced ECU. Decrease of components in the torque sensor leads to high reliability. Adjustment information can be modified and stored according to other system specifications, so that flexibility to various usages is enhanced.

(Second Embodiment)

Figure 3:
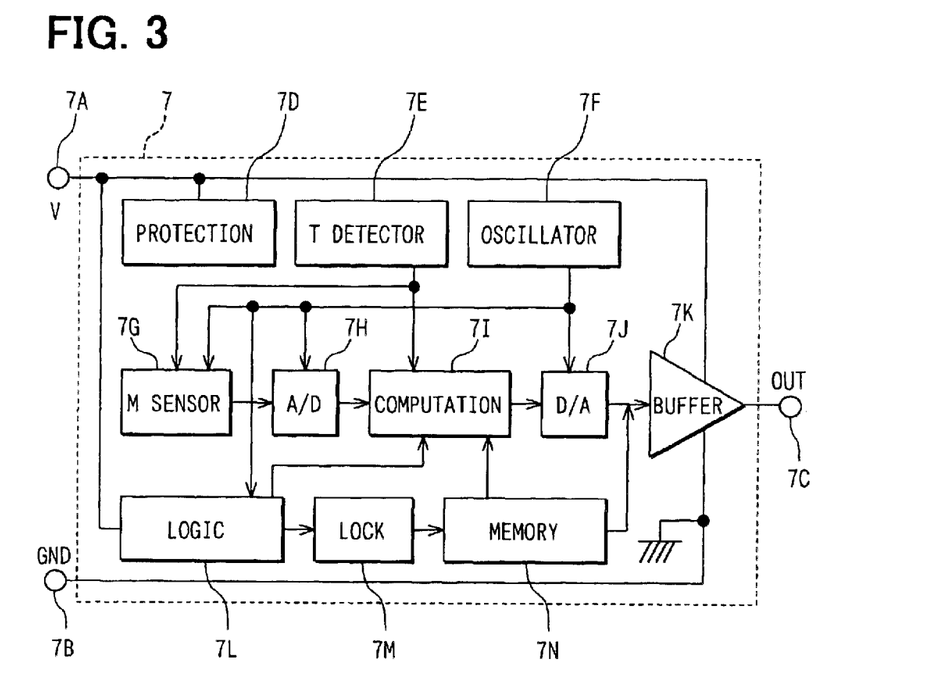
FIG. 3 is a block diagram of a magnetometric sensor IC of the torque sensor system.
Figure 5:
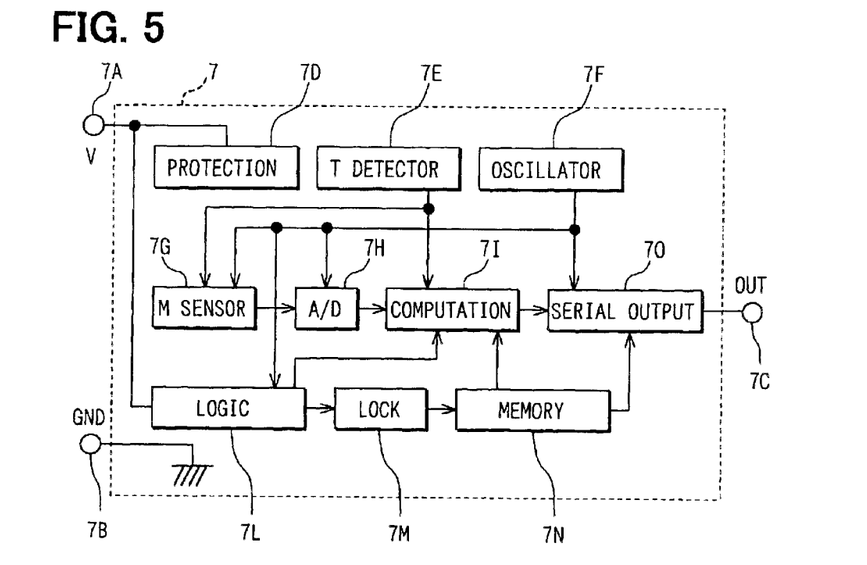
FIG. 5 is a block diagram of a magnetometric sensor IC according to a second embodiment.

Referring to FIG. 5, in a second embodiment, a serial output section 70 is adopted for executing serial output of digital signals as substitution of the D/A converter section 7J and buffer 7K shown in FIG. 3.

In this embodiment, adoption of the serial output can prevent several problems resulting from the analog voltage output such as an error from voltage reduction due to wiring resistance, and adverse effect from electro-magnetic noise. Additionally, in an ECU that receives the digital signal outputted from the serial output section 70, adverse effect from high frequency noise is decreased through a low-pass filter without decreasing accuracy of the digital signals.

(Third Embodiment)

Figure 6:
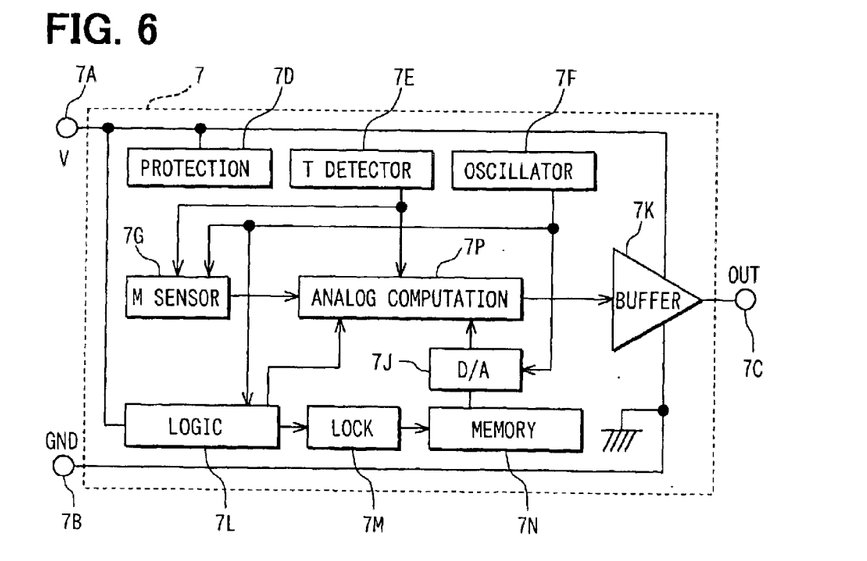
FIG. 6 is a block diagram of a magnetometric sensor IC according to a third embodiment.

Referring to FIG. 6, in a third embodiment, an analog computation circuit 7P is adopted as substitution of the computation section 7I shown in FIG. 3. The analog computation circuit 7P is formed from various computation circuits using operational amplifiers for executing computation commanded by the logic section 7L. Based on the substitution, an output signal is converted, by a D/A converter section 7J, to analog voltage to output to the analog computation circuit 7P. In this embodiment, adoption of the analog computation circuit 7P leads to deletion of the A/D converter section 7H shown in FIG. 3, so that simple circuitry and rapid computation are realized.

(Fourth Embodiment)

Figure 2:
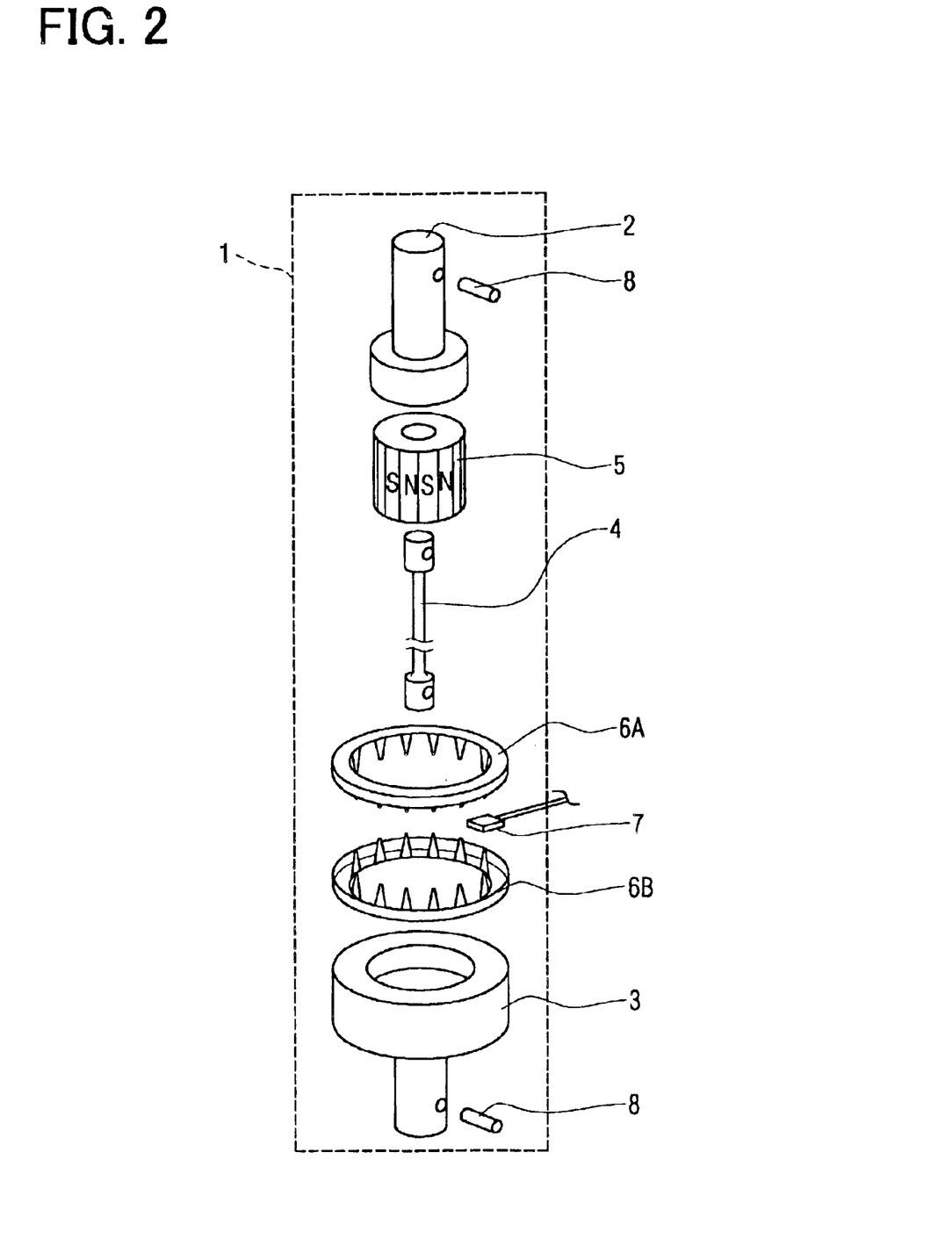
FIG. 2 is a disassembled perspective view of the torque sensor system.
Figure 7:
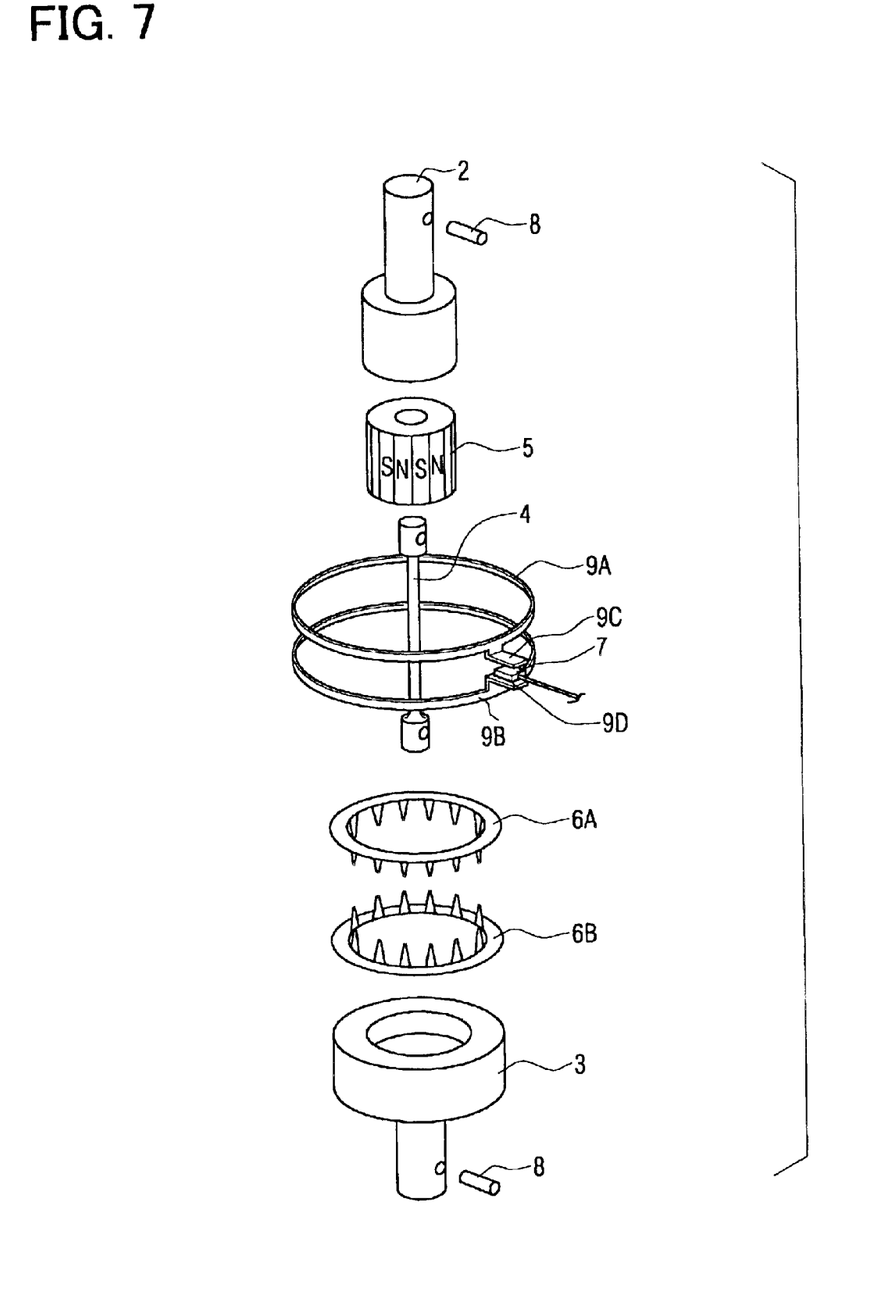
FIG. 7 is a disassembled perspective view of a torque sensor system according to a fourth embodiment.

Referring to FIG. 7, in a fourth embodiment, a pair of magnetism-collecting rings 9A, 9B is added. The pair of the magnetism-collecting rings 9A, 9B, made of a soft magnetic member, is for drawing to converge, to one point, magnetic flux that generates from a ring magnet 5 and passes between a pair of two magnetic yoke halves 6A, 6B. The magnetism-collecting rings 9A, 9B are fixed in stationary state at a predetermined narrow gap relative to circumferential edges of circular ring plates of the magnetic yoke halves 6A, 6B, respectively. The magnetism-collecting rings 9A, 9B have magnetism-collecting plates 9C, 9D, respectively. The magnetism-collecting plates 9C, 9D, made of a soft magnetic member, extend radially-outwardly at predetermined points while facing with each other with a predetermined axial spacing. The predetermined axial spacing between the plates 9C, 9D is much narrower than that between the rings 9A, 9B. The axial spacing between the rings 9A, 9B are set to be adequately large, while the magnetic yoke halves 6A, 6B have no cylinder hollows shown in FIGS. 1 and 2.

Under the above structure, the magnetic flux enter one of the magnetism-collecting rings 9A, 9B from adjoining one of the annular ring plates of the yokes 6A, 6B. It then proceeds to the other of the manetism-collecting ring 9A, 9B through the mutual plates 9C, 9D. It further proceeds to the other of the annular ring plates of the yokes 6A, 6B. Almost all the magnetic flux is therefore converged between the plates 9C, 9D, passing through a magnetometric sensor IC 7 that is disposed between the plates 9C, 9D. This structure enhances sensitivity of the torque sensor and reduces errors from axial displacement, in comparison with that of the first embodiment shown in FIGS. 1 and 2.

What is claimed is:

1. A torsion bar type torque sensor system, disposed between an input shaft and an output shaft, using an output-adjustment embedded semiconductor sensor that integrates a plurality of sections including:

a detecting section for detecting at least either of a physical amount and a chemical amount as an electric amount;

a thermal detecting section for detecting temperature; a non-volatile rewritable memory section for rewritably storing adjustment data to adjust an error of the detected electric amount; and an adjustment computation section for outputting an adjusted signal after offset adjustment of the detected electric amount, sensitivity adjustment and temperature adjustment, based on the detected temperature and the stored adjustment data, the torsion bar type torque sensor system comprising:

an elastic member that combines the input shaft and the output shaft and converts torque to a torsion displacement;

a ring magnet that, fixed coaxially with one of the input shaft and the output shaft, surrounds the elastic member and has circumferentially a plurality of first magnetic poles and a plurality of second magnetic poles, wherein each first pole and each second pole are alternately disposed at a predetermined circumferential pitch; and two magnetic yoke halves that, fixed coaxially with the other of the input shaft and the output shaft, face each other at a predetermined axial spacing and surround the ring magnet at a predetermined radial gap, wherein magnetic flux of the ring magnet flows sequentially through the two magnetic yoke halves, wherein the detecting section, disposed within the predetermined axial spacing between the two magnetic yoke halves, detects the magnetic flux modulated by an relatively rotated angle between the input shaft and the output shaft.

2. A torsion bar type torque sensor system according to claim 1, wherein the output-adjustment embedded semiconductor sensor that integrates a plurality of sections further includes:

an operation control section that externally receives an operation command and subsequent adjustment data, wherein the operation control section writes the subsequent adjustment data in the non-volatile rewritable memory when the operation command is a writing command to command to write the subsequent adjustment data in the non-volatile rewritable memory.

3. A torsion bar type torque sensor system according to claim 2,
wherein the operation control section receives the operation command and the subsequent adjustment data based on binary voltage signals superimposed on applied power voltage.

4. A torsion bar type torque sensor system according to claim 2,
wherein, when the operation command is a writing-prohibiting command to command to prohibit writing of the subsequent adjustment data in the non-volatile rewritable memory, the operation control section prohibits the writing of the subsequent adjustment data in the non-volatile rewritable memory even if the operation control section receives the writing command after the ring-prohibiting command.

5. A torsion bar type torque sensor system according to claim 1,
wherein the adjustment computation section is formed of a central control unit including an analog/digital converter section that converts to a digital signal an analog signal voltage outputted from the detecting section, and
wherein the non-volatile rewritable memory section stores an adjustment computation program for the central control unit.

6. An output-adjustment embedded semiconductor sensor that integrates a plurality of sections, the sensor comprising:
a detecting section for detecting at least either of a physical amount and a chemical amount as an electric amount;
a thermal detecting section for detecting temperature;
a non-volatile rewritable memory section for rewritably storing adjustment data to adjust an error of the detected electric amount;
an adjustment computation section for outputting an adjusted signal after offset adjustment of the detected electric amount, sensitivity adjustment and temperature adjustment, based on the detected temperature and the stored adjustment data; and an operation control section that externally receives an operation command and subsequent adjustment data based on binary voltage signals superimposed on applied power voltage.

7. An output-adjustment embedded semiconductor sensor according to claim 6,
wherein the operation control section writes the subsequent adjustment data in the non-volatile rewritable memory when the operation command is a writing command to command to write the subsequent adjustment data in the non-volatile rewritable memory.

8. An output-adjustment embedded semiconductor sensor according to claim 7,
wherein, when the operation command is a writing-prohibiting command to command to prohibit writing of the subsequent adjustment data in the non-volatile rewritable memory, the operation control section prohibits the writing of the subsequent adjustment data in the non-volatile rewritable memory even if the operation control section receives the writing command after the writing-prohibiting command.

9. An output-adjustment embedded semiconductor sensor according to claim 6,
wherein the adjustment computation section is formed of a central control unit including an analog/digital converter section that converts to a digital signal an analog signal voltage outputted from the detecting section, and
wherein the non-volatile rewritable memory section stores an adjustment computation program for the central control unit.

10. A torsion bar type torque sensor system, disposed between an input shaft and an output shaft, the torsion bar type torque sensor system comprising:
an output-adjustment embedded semiconductor sensor that includes, as integrated sections,
a detecting section for detecting at least either of a physical amount and a chemical amount as an electric amount;
a thermal detecting section for detecting temperature;
a non-volatile rewritable memory section for rewritably storing adjustment data to adjust an error of the detected electric amount;
an adjustment computation section or outputting an adjusted signal after offset adjustment of the detected electric amount, sensitivity adjustment and temperature adjustment, based on the detected temperature and the stored adjustment data; and
an operation control section that externally receives an operation command and subsequent adjustment data based on binary voltage signals superimposed on applied power voltage;
an elastic member that combines the input shaft and the output shaft and converts torque to a torsion displacement;
a ring magnet that, fixed coaxially with on of the input shaft and the output shaft, surrounds the elastic member and has circumferentially a plurality of first magnetic poles and a plurality of second magnetic poles, wherein each first pole and each second pole are alternately disposed at a predetermined circumferential pitch; and
two magnetic yoke halves that, fixed coaxially with the other of the input shaft and the output shall, face each other at a predetermined axial spacing and surround the ring magnet at a predetermined radial gap, wherein magnetic flux of the ring magnet flow sequentially through the two magnetic yoke halves,
wherein the detecting section, disposed within the predetermined axial spacing between the two magnetic yoke halves, detects the magnetic flux modulated by a relatively rotated angle between the input shaft an the output shaft.

11. A torsion bar type torque sensor system according to claim 10,
wherein the operation control section write the subsequent adjustment data in the non-volatile rewritable memory when the operation command is a writing command to command to write the subsequent adjustment data in the non-volatile rewritable memory.

12. A torsion bar type torque sensor system according to claim 11, wherein, when the operation command is a writing-prohibiting command to command to prohibit writing of the subsequent adjustment data in the non-volatile rewritable memory, the operation control section prohibits the writing of the subsequent adjustment data in the non-volatile rewritable memory even if the operation control section receives the writing command after the writing-prohibiting command.

13. A torsion bar type torque sensor system according to claim 10, wherein the adjustment computation section is formed of a central control unit including an analog/digital converter section that converts to a digital signal an analog signal voltage outputted from the detecting section, and wherein the non-volatile rewritable memory section stores an adjustment computation program for the central control unit.

* * * * *